Sept. 26, 1933.   J. D. HOUCK   1,927,937
COFFEE MAKING DEVICE
Filed Dec. 29, 1930   2 Sheets-Sheet 1
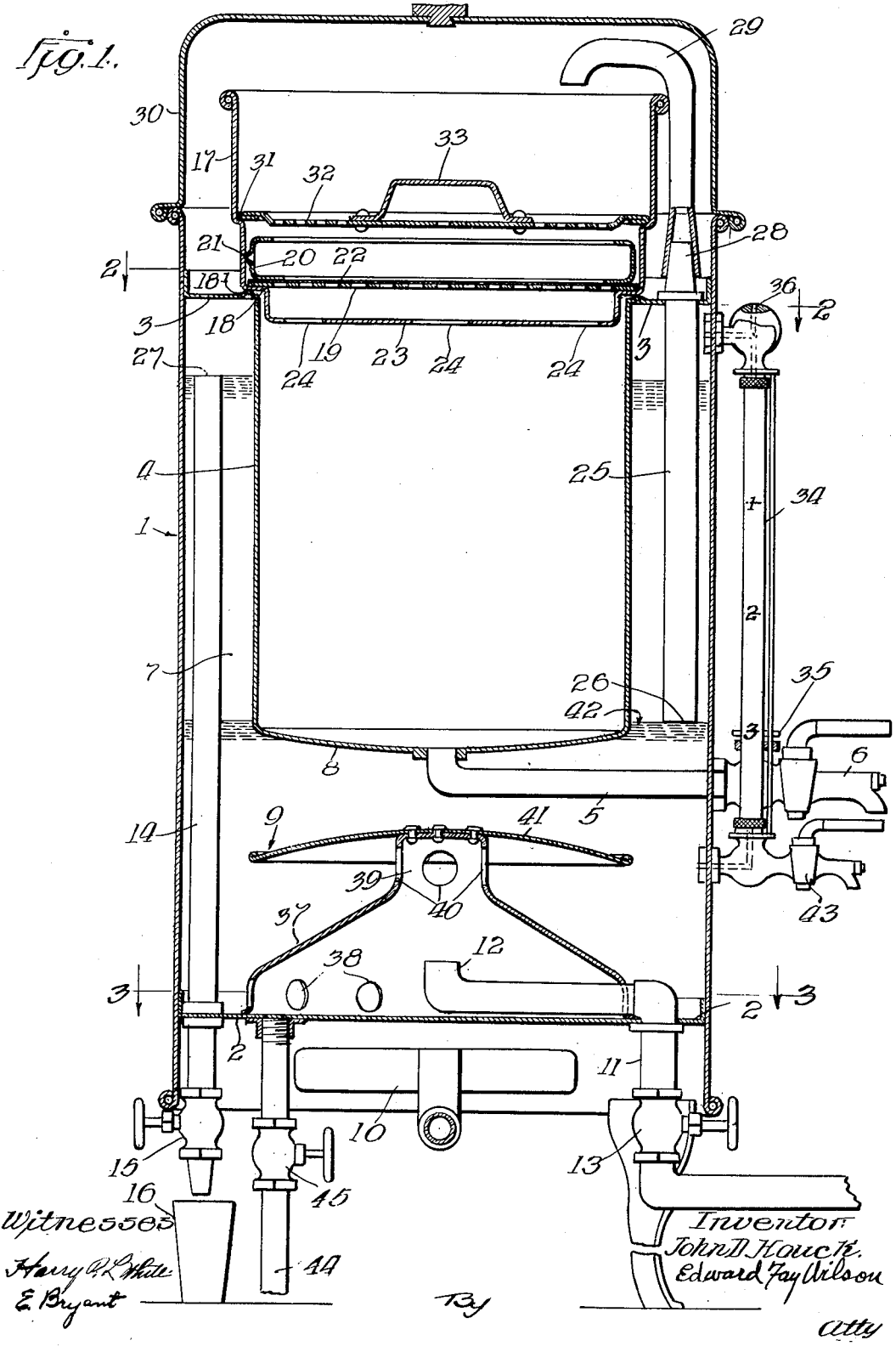

Sept. 26, 1933.   J. D. HOUCK   1,927,937
COFFEE MAKING DEVICE
Filed Dec. 29, 1930   2 Sheets-Sheet 2
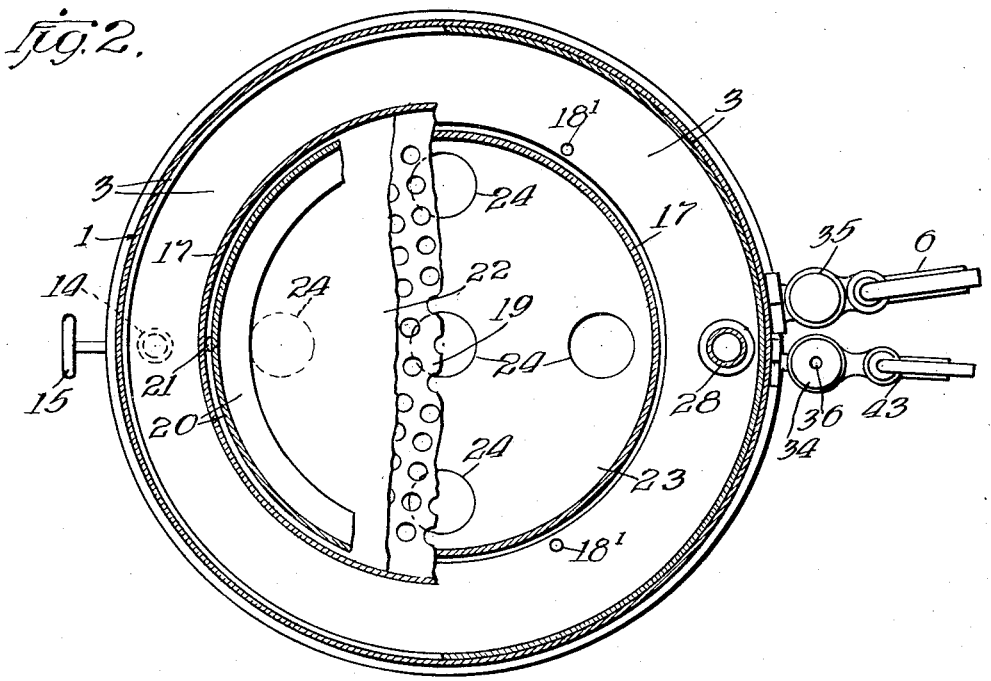
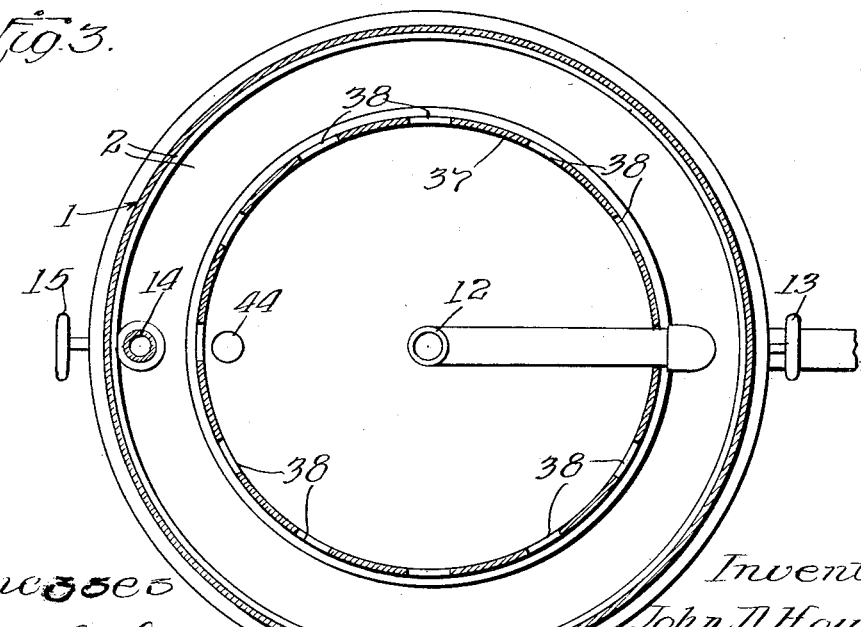

Patented Sept. 26, 1933

1,927,937

UNITED STATES PATENT OFFICE 1,927,937

COFFEE MAKING DEVICE

John D. Houck, Chicago, Ill.

Application December 29, 1930
Serial No. 505,368

3 Claims. (Cl. 53—3)

This invention relates to improvements in coffee making devices and has special reference to urns for use in restaurants, etc.

The object of the invention is to improve such devices in the matter of the application of the water to the coffee in the process of making coffee to the end that the desired quantity of boiling water, and no more, shall be applied.

A further object is to provide a device of this character having an inner coffee container immersed in water in a casing and means for applying heat to boil the water, and so arranged that the boiling or hottest water is prevented from direct impingement against the bottom of the coffee container but is forced to mix and intermingle with the whole body of water.

Another object is to provide a device of this character so constructed that the application of the water to the coffee is controlled by a simple valve, the closing of which causes the hot water to be forced out of the casing and into the coffee basket, the quantity of water thus transferred being controlled by the construction of the device.

The invention resides in a coffee making urn so constructed that the objects may be attained and which includes an overflow for limiting the quantity of water supplied to the urn for making a batch of coffee, a conduit for delivering the hot water from the urn casing into the filter basket for leaching out the coffee essence, the delivery conduit being so related to the overflow that only the desired quantity of hot water shall be delivered.

The invention also resides in a novel deflector arranged in the bottom of the urn and adapted to cause the water as it rises, due to the application of heat, to be deflected from direct impingement against the bottom of the container and causes it to mix and mingle with the body of water in the urn.

The invention will be more readily understood from the following description taken in conjunction with the appended claims and the accompanying drawings forming part of this specification and in which:—

Fig. 1 is a central, vertical, sectional view of a coffee making urn embodying the invention in one form; and Figs. 2 and 3 are horizontal sections on the lines 2—2 and 3—3, respectively, of Fig. 1.

In said drawings, 1 is an outer casing closed at its lower end by a sealed-in bottom 2 and is closed near its upper end by a sunken horizontal partition 3. The partition 3 is preferably formed integrally with an inner compartment or vessel 4 which depends from the partition 3 within the casing. The inner vessel or compartment 4 contains the coffee brew and this is withdrawn for use through a delivery pipe 5 connected at its inner end with the bottom 8 of the compartment 4 and extending out through the wall of the casing, its outer end provided with a draft cock 6.

The compartment 7 formed within the casing and outside of the compartment 4 forms a reservoir for water for use in making the coffee. The bottom 8 of the compartment 4 is spaced above the bottom 2 of the casing sufficient to provide room for a deflecting device 9 which I provide for preventing the boiling of the brew contained in compartment 4 and causing the incoming cold water to be mixed with the hot water in the device.

Below the bottom 2 of the casing is arranged a suitable gas burner 10 which supplies heat for making the coffee.

A water supply pipe 11 enters through the bottom 2, preferably at one side, and preferably extends to the center of the casing and is provided at its delivery end with an up-turned elbow 12. The pipe 11 is provided with a hand valve 13 for controlling the supply of fresh water.

An overflow pipe 14 is provided which extends up in the casing between the casing and the inner compartment 4 and terminates at a predetermined point. The overflow pipe 14 is provided with a hand valve 15 by which it may be closed and I preferably provide an open drain 16 to receive the overflow and so arranged that when the excess water flows out through the overflow, it can be seen. As explained, the water supply pipe delivers the fresh water into the casing in the space surrounding the compartment 4 and the water is heated to a desired temperature, preferably to about the boiling point before it is transferred from the casing into the inner compartment in the process of making the coffee.

In the upper part of the casing is arranged a ground coffee basket member 17. This basket member is formed with an external circumferential shoulder 18 near its bottom, adapted to rest on the horizontal partition 3 at the edge of the compartment 4 and a number of small pressed-up protuberances 18′ are provided on this shoulder so that the chamber 4 will not be sealed by the basket.

A removable perforated sheet metal plate 19 is arranged and adapted to seat on the upper surface of the off-set which forms the shoulder 18. This plate 19 is adapted to be held tightly pressed down in position by a holding ring 20 which is formed to fit in the basket above the plate and is provided with a number of pressed-out protuberances 21 for frictionally engaging the wall of the basket to hold the ring in place and to permit its easy withdrawal from holding position.

A filter sheet 22 of suitable material, such as cloth or paper, covers the foraminous plate 19 and prevents the coffee grains falling through the openings in the plate. The basket may have a bottom 23 spaced down from the plate 19 and when a bottom is used, it is preferably provided with a number of relatively large holes 24 through which the liquid passing through the filter can readily flow down into the compartment 4.

The walls of the basket extend some distance above the plate 19 so as to provide ample capacity to receive the water, without overflowing, which is delivered from the lower compartment 7.

A vertically arranged pipe 25 is provided, sealed in the partition 3 and extending down into the lower compartment 7. Its extreme end 26 is arranged at a predetermined distance below the extreme top 27 of the overflow pipe 14 so that a predetermined quantity of water, and no more, can be transferred from the lower compartment to the basket 17.

The upper end 28 of the riser pipe 25 terminates in goose-neck 29 which is adapted to extend over the top of the basket and deliver the water into the basket. Preferably, the connection between the goose-neck 29 and the upper end 28 of the pipe 25 is of an elongated, tapered form, so that the goose-neck, while being readily removable, will be held firmly in place when placed in position.

The casing 1 is provided with a suitable removable cover 30 for closing the top of the urn.

The basket 17 is provided with a second ledge 31, above the ledge upon which the perforated plate 19 is supported, adapted to receive and support a distributor plate 32. This distributor plate is a plate made of flat sheet metal perforated over substantially its whole area and is adapted to uniformly distribute the water received through the goose-neck 29 over the body of ground coffee which is in the basket. The ground coffee is placed on the filter sheet and the space between the filter sheet and the distributor plate is ample for this purpose. The distributor plate 32 is preferably provided with a handle 33 for convenience in lifting out the plate.

Upon the side of the casing 1 there is arranged a glass tube gauge glass 34 connected at its ends to the casing 1 so that the level of the water which is in the casing may be seen and also so that the transfer of the water from the casing 1 to the compartment 4 may be watched.

The urn shown in the drawings is presumed to have a capacity of three gallons of coffee brew and the glass gauge 34 is marked to indicate one, two and three gallons by the figures 1, 2 and 3 shown on the glass tube at appropriate heights.

An appropriate coffee gauge 35 similar to the water gauge 34 may be provided in connection with the draft cock 6 and provided at its upper end with a vent opening 36 so that the coffee level will be accurately shown in the gauge glass.

The difference in level of the upper end 27 of the overflow pipe 14 and the lower end 26 of the transfer pipe 25 is such that there is a three gallon volume of water between these two points and by the proper manipulation of the control valves, this quantity of water and no more is transferred from the lower casing into the basket when it is desired to brew the coffee.

The baffle 9 consists of a flared out bottom skirt part 37 provided with openings 38 spaced around it near its lower edge which is secured upon the bottom 2 of the casing. The part 37 terminates at its top in a short neck part 39 of relatively small diameter and provided with openings 40 in its sides.

A relatively large distributer plate 41 constitutes the top of the baffle 9. This plate is preferably dished and downwardly curved and this plate is smaller in diameter than the casing 1 so as to leave ample passage at its edge for the circulation of the water in the use of the urn. The distributer plate 41 is preferably spaced down from the bottom 8 of the compartment 4 to allow plenty of room for the circulation of water between the two and the lower part of the casing 1 below the lower end of the riser 25 has ample water capacity so that the temperature of the water is not materially lowered when the water for another brew is supplied through the inlet pipe 11.

As shown, the delivery elbow 12 on the inlet pipe 11 is preferably centrally arranged beneath the baffle 9.

If we presume that in the operation of the device, the water stands in the casing at its lower level, that is, at the lower end 26 of the transfer pipe 25 as indicated at 42, and the compartment 4 has been drained of brewed coffee and the urn is to be operated to make another brew. First, the proper quantity of ground coffee is placed in the basket 17 on the filter 22, the distributer plate 32 is placed in position, the goose-neck is also placed in position and the urn is closed by the cover 30. We may also presume that the water in the urn is hot and that the gas burner 10 is lighted.

The first operation is to supply the urn with the water required for the next brew. This is done by opening the water supply valve 12 and the fresh water which is relatively cool will enter beneath the baffle 9. It will be projected up into the neck part 39 through the water in the urn. It will flow out through the openings 40 and beneath the distributer plate 41, mingling all the time with the water in the urn. The downwardly curved shape of the baffle plate 41 causes this relatively cool entering water to circulate down into the hot water in the lower part of the urn before it escapes above the baffle. By this action the cold water is tempered or warmed before it contacts with the coffee compartment so that if, at this time, there may be some coffee brew still in the compartment 4, it will not be unduly cooled.

The overflow valve 15 and the water supply valve 13 are then opened and the water flows into the casing through the baffle member 9 becoming mixed with the hot water already in the casing.

As soon as the water begins to overflow, as observed at the outlet end of the overflow pipe, the supply valve 13 is closed. The water now stands at the upper level 27 in the casing, that is, the pre-arranged quantity of water has been added.

As soon as the steam begins to issue from the overflow pipe, indicating that the water in the casing has been heated to a boiling temperature, the overflow valve 15 is closed. As soon as the overflow valve is closed, pressure begins to accumulate in the lower compartment 7 and as there is an open escape through the transfer pipe 25, the accumulating pressure soon causes the hot water to flow up through the transfer pipe 25 and be delivered into the basket 17 onto the distributing plate 32 through the goose-neck 29.

The hot water continues to be transferred, as explained, until the level in the compartment 7 drops down to the entrance end of the pipe 25 at which time the predetermined amount, in this case three gallons, has been transferred.

At this time the gas may be turned down to some extent so as not to produce too much steam.

The transferred water gradually leaches down through the ground coffee in the basket and accumulates in the compartment 4 from which it may be withdrawn through the draft cock 6.

It is usual in making coffee in such urns to draw off a quantity of the first brew and by pouring it back into the basket 17, cause t to pass a second time through the ground coffee.

Hot, clear water may be drawn from the casing through a cock 43 in connection with the gauge glass 34, which indicates the water level in the casing.

A drain pipe 44 is connected through the bottom 2 of the casing by which the casing can be drained and this pipe is controlled by a hand valve 45.

The manner of use, while being practical as explained, is preferably in actual use varied to the extent that the overflow valve 15 is opened and the cold water supply valve 13 is opened slightly as soon as the hot water for making the coffee has been transferred from the casing compartment 7 of the basket 17. This permits the gradual addition of the fresh water during the time the hot water is leaching down through the coffee and does not cool down the contents of the urn.

I do not herein claim the improvement disclosed herein of means for measuring the quantity of hot water discharged from the water heating compartment to the coffee brew compartment, such forming a part of the subject matter of my co-pending application for patent on improvements in coffee making urns filed June 29, 1933, Serial No. 678,158.

As many modifications of the invention will readily suggest themselves to one skilled in the art, I do not limit or confine the invention to the specific arrangement of parts and devices herein shown and described except within the scope of the appended claims.

I claim:

1. In a coffee making device, a closed casing for hot water, an open-topped coffee brew container suspended in the casing, a heater below the casing for heating the water therein, a hot water diffuser in the lower end of the casing and above the heater, the diffuser arranged and adapted to form a heating chamber above the heater, the diffuser provided with openings adjacent water to be heated and with outlets near its top for discharging the heated water, and a baffle plate on the diffuser above the discharge openings, the baffle plate arranged and adapted to cause the heated water to be discharged into the body of water in the casing and prevent its direct impingement against the bottom of the coffee brew container.

2. The invention as defined in claim 1, the baffle plate being substantially the area of the bottom of the coffee container and arranged substantially directly beneath same.

3. The invention as defined in claim 1 and a fresh water supply pipe for the casing arranged and adapted to discharge fresh water within the lower end of the diffuser.

JOHN D. HOUCK.